United States Patent
Boillot et al.

(10) Patent No.: US 10,043,283 B2
(45) Date of Patent: Aug. 7, 2018

(54) PROCESS TRACKING LASER CAMERA WITH NON-EYE-SAFE AND EYE-SAFE OPERATING MODES

(71) Applicant: SERVO-ROBOT INC., Saint-Bruno (CA)

(72) Inventors: Jean-Paul Boillot, Saint-Bruno (CA); Éric Bureau, Varennes (CA); Jacques-André Gaboury, Saint-Bruno (CA)

(73) Assignee: Servo-Robot, Inc., Saint Bruno, QC ( * ) Notice: Subject to any disclaimer, the term of this patent is extended or adjusted under 35 U.S.C. 154(b) by 119 days.

(21) Appl. No.: 15/168,455

(22) Filed: May 31, 2016

(65) Prior Publication Data
US 2017/0345157 A1    Nov. 30, 2017

(51) Int. Cl.
| G06K 9/00 | (2006.01) |
| G06T 7/20 | (2017.01) |
| G06T 7/33 | (2017.01) |
| B23K 26/03 | (2006.01) |
| H04N 5/225 | (2006.01) |
| H04N 5/232 | (2006.01) |

(52) U.S. Cl.
CPC .............. *G06T 7/20* (2013.01); *B23K 26/032* (2013.01); *G06T 7/33* (2017.01); *H04N 5/2256* (2013.01); *H04N 5/2257* (2013.01); *H04N 5/23241* (2013.01); *H04N 5/23245* (2013.01)

(58) Field of Classification Search
CPC .......... G06T 7/20; G06T 7/33; B23K 26/032; H04N 5/2256; H04N 5/23241; H04N 5/23245
See application file for complete search history.

(56) References Cited

U.S. PATENT DOCUMENTS

| 6,008,466 A | 12/1999 | Hosoda |
| 6,352,354 B1 | 3/2002 | Boillot et al. |
| 6,730,926 B2 | 5/2004 | Boillot et al. |
| 2013/0341312 A1 | 12/2013 | Kessler et al. |
| 2015/0255943 A1 | 9/2015 | Voloden et al. |
| 2016/0097857 A1* | 4/2016 | Gokay .................... F41G 3/06 356/5.01 |

OTHER PUBLICATIONS

Seon Kim et al (a robust method for vision-based seam tracking in Robotic arc welding, IEEE 1995).*

(Continued)

*Primary Examiner* — Amara Abdi

(57) ABSTRACT

A process tracking laser camera with non-eye-safe and eye-safe operating modes is disclosed. The camera has an image sensor with a field of view covering a target area of a workpiece. The camera also has first and second laser units for projecting respectively non-eye-safe and eye-safe laser beams towards the target area. A control unit has laser drivers for driving the laser units, a cut-off circuit operatively connected to the laser driver of the first laser unit for disabling its operation depending on a control signal, and a control circuit for controlling the laser drivers depending on a cut-off condition of the cut-off circuit controlled by a switch device so that the first laser unit is enabled and the second laser unit is disabled in the non-eye-safe operating mode while the first laser unit is disabled and the second laser unit is enabled in the eye-safe operating mode.

18 Claims, 5 Drawing Sheets

(56) References Cited

OTHER PUBLICATIONS

Kim et al (a robust method for vision-based seam tracking in Robotic arc welding, IEEE 1995).*
Ludwig et al., "Portable Weld Inspection Management System", CNST-2005-323 Final Report, Feb. 2007.*
Boillot et al., "Smart Laser Welding and Monitoring of Sheet Materials", International Auto Body Congress, Dearborn, USA Oct. 2014.*
Noruk et al., "Laser Tool offers Alternative for Precise Visual Weld Inspection", pp. 15-17, Inspection Trends/Fall 2011, AWS-IT Oct. 13, 2011.*
Kim et al., "A Robust Method for Vision-Based Seam Tracking in Robotic Arc Welding", May 1995, pp. 363-368, IEEE.

* cited by examiner

PROCESS TRACKING LASER CAMERA WITH NON-EYE-SAFE AND EYE-SAFE OPERATING MODES

FIELD OF THE INVENTION

The present invention relates to robot laser vision systems and more particularly to a process tracking laser camera with non-eye-safe and eye-safe operating modes.

BACKGROUND

Joint or seam tracking laser cameras are usually designed with a triangulation laser looking ahead at a fixed distance in front of a process tool attached to a robot. In order to track a joint or an edge or any shape during processing, the cameras are equipped with tracking lasers having sufficient power to provide good signal-to-noise ratio in presence of perturbations by light radiation resulting from welding plasma in electric arc or laser welding, or by welding fumes and spatters or by laser reflection on metallic joints of complex geometry. Such tracking lasers are usually of class 3B type (or IIIb, USA FDA 21 CFR, Ch. 1, sect. 1040.10), which is not safe for human eyes according to IEC 60825-1 standard. For high power laser welding, safety restrictions and measures must be enforced.

Known in the art is US patent application No. 2013/0341312 (Kessler et al.) showing a welding tool with a housing enclosing a fiber laser system. A particular switching element provided on the housing switches a power supply of the fiber laser on when an exit slit is sitting on one of the workpieces and thus activates the fiber laser in that position.

When adjusting and programming robots equipped with tracking laser cameras, operators must wear special protective eyewear. Operators often complain about using unpleasant protective eyewear that prevent clear vision of the working environment. In some plants, other workers in addition to the robot operators must be present at the same place and time during robot programming that may take considerable time. It would be desirable to ease the safety restrictions and allow free vision during robot teaching adjustments.

SUMMARY

According to an aspect of the present invention, there is provided a process tracking laser camera with non-eye-safe and eye-safe operating modes, comprising:

an image sensor having a field of view covering a target area of a workpiece;

a first laser unit for projecting a non-eye-safe laser beam towards the target area of the workpiece;

a second laser unit for projecting an eye-safe laser beam towards the target area of the workpiece, the eye-safe laser beam having an appearance different from the non-eye-safe laser beam;

a control unit having first and second laser drivers for respectively driving the first and second laser units, a cut-off circuit operatively connected to the first laser driver for disabling operation of the first laser unit depending on a control signal, and a control circuit for controlling the first and second laser drivers depending on a cut-off condition of the cut-off circuit so that the first laser unit is enabled and the second laser unit is disabled in the non-eye-safe operating mode while the first laser unit is disabled and the second laser unit is enabled in the eye-safe operating mode; and a switch device connected to the cut-off circuit for providing the control signal controlling the cut-off condition of the cut-off circuit according to a predetermined position setting of the switch device corresponding to the non-eye safe and eye-safe operating modes respectively.

BRIEF DESCRIPTION OF THE DRAWINGS

A detailed description of preferred embodiments will be given herein below with reference to the following drawings.

DETAILED DESCRIPTION OF THE PREFERRED EMBODIMENTS

Figure 1:
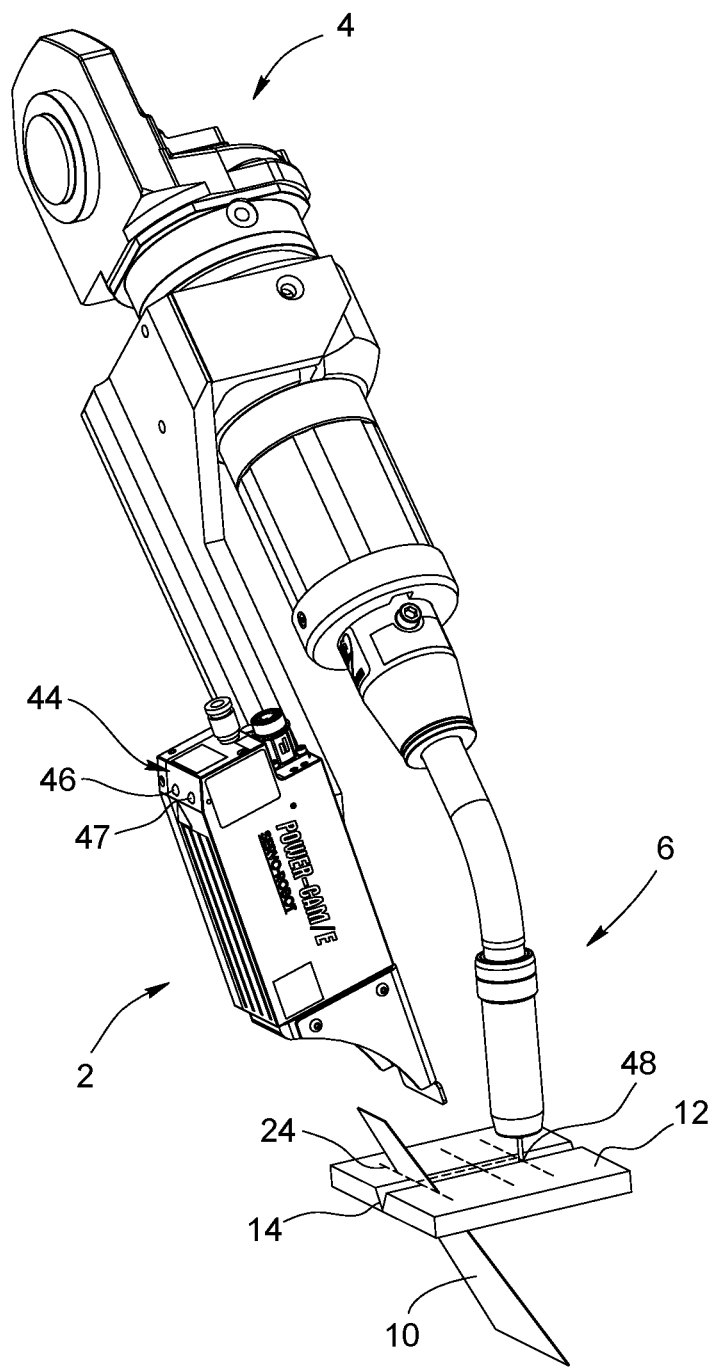
FIG. 1 is perspective schematic view of a robot process tool attached to a robot wrist provided with a process tracking laser camera according to an embodiment of the present invention.

Referring to FIG. 1, there is shown a process tracking laser camera 2 with non-eye-safe and eye-safe operating modes according to an embodiment of the present invention. The camera 2 is attached to a robot wrist 4 provided with a process tool 6 such as a welding torch.

Figure 3:
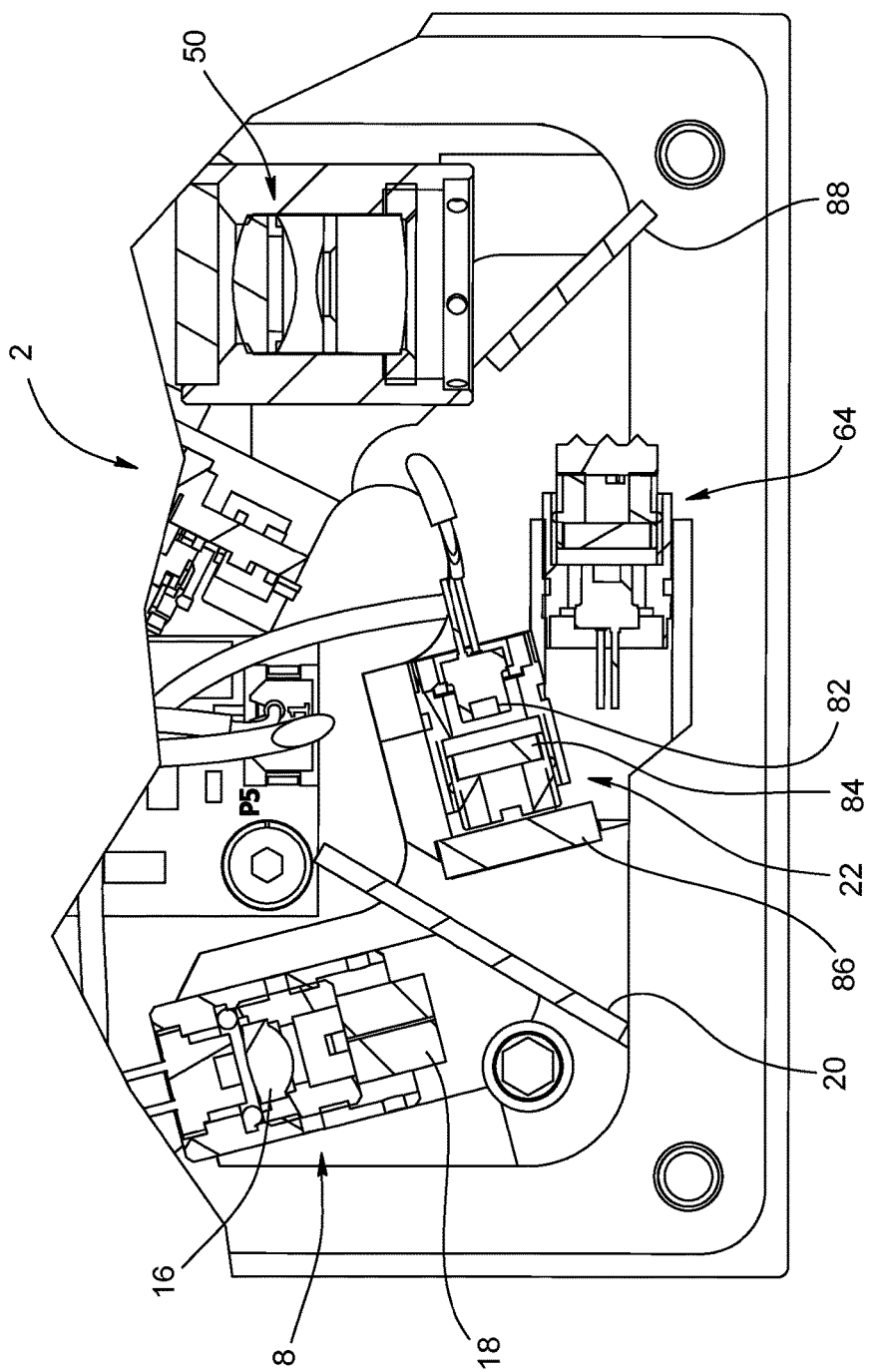
FIG. 3 is a partial schematic view showing an arrangement of eye-safe and non-eye-safe laser units of a process tracking laser camera according to an embodiment of the present invention.

Referring also to FIG. 3, the camera 2 has an image sensor 50 (also called a triangulation sensor) having a field of view covering a target area of a workpiece 12, for example to allow viewing the workpiece 12 at a look-ahead distance from the process tool 6. The camera 2 has a first laser unit 8 for projecting a non-eye-safe laser beam 10 towards the target area of the workpiece 12. The first laser unit 8 is used along with the image sensor 50 for 3D laser profiling or tracking a joint 14 during processing, with a class 3B laser source to overcome perturbations of the processing environments such as plasma light radiation, welding fumes and spatters, or to deal with the surface albedo. A 3B class laser source is considered to be unsafe for operator's eyes and requires wearing special protection eyewear, e.g. glasses or goggles, when programming the process robot (not shown in the Figures). The laser sources used in welding tracking laser cameras are generally red laser diodes of about 100 mW with a wavelength of 660 nm. For some applications, another color and wavelength can be used such as infrared laser of 800 nm or blue laser of 405 nm. The first laser unit 8 may have such a laser diode provided with a high quality laser diode optical collimator 16 and a high quality line lens 18. The laser beam 10 may form a tracking laser line centered on the weld joint 14.

The camera 2 has a second laser unit 22 for projecting an eye-safe laser beam 24 (as shown in dashed line in FIG. 1) towards the target area of the workpiece 12. The eye-safe laser beam 24 has an appearance different from the non-eye-safe laser beam 10. The appearance of the eye-safe laser beam 24 may be a flashing state, a color (preferably green but it can be another color if desired), a pattern different from that of the non-eye-safe laser beam 10. The power of the second laser unit 22 is lower than the first laser unit 8 as for example obtained with a class 3R, IIIa, 2M, 2, 1M, 1 laser source. The laser source may for example be a green laser source having an power of 5 mW and a wavelength of 520 nm. A laser source having a higher output power such as 15 mW may be used provided that the accessible emission limit (AEL) power is adjusted, for example current limited or the laser beam transmissivity is limited by intervening optical elements in the camera 2.

The first and second laser units 8, 22 may be positioned closed to each other and have a common optical arrangement such as a beam splitter/combiner 20 for coincidentally projecting the respective laser beams 10, 24 at a same location on the workpiece 12.

Figure 4:
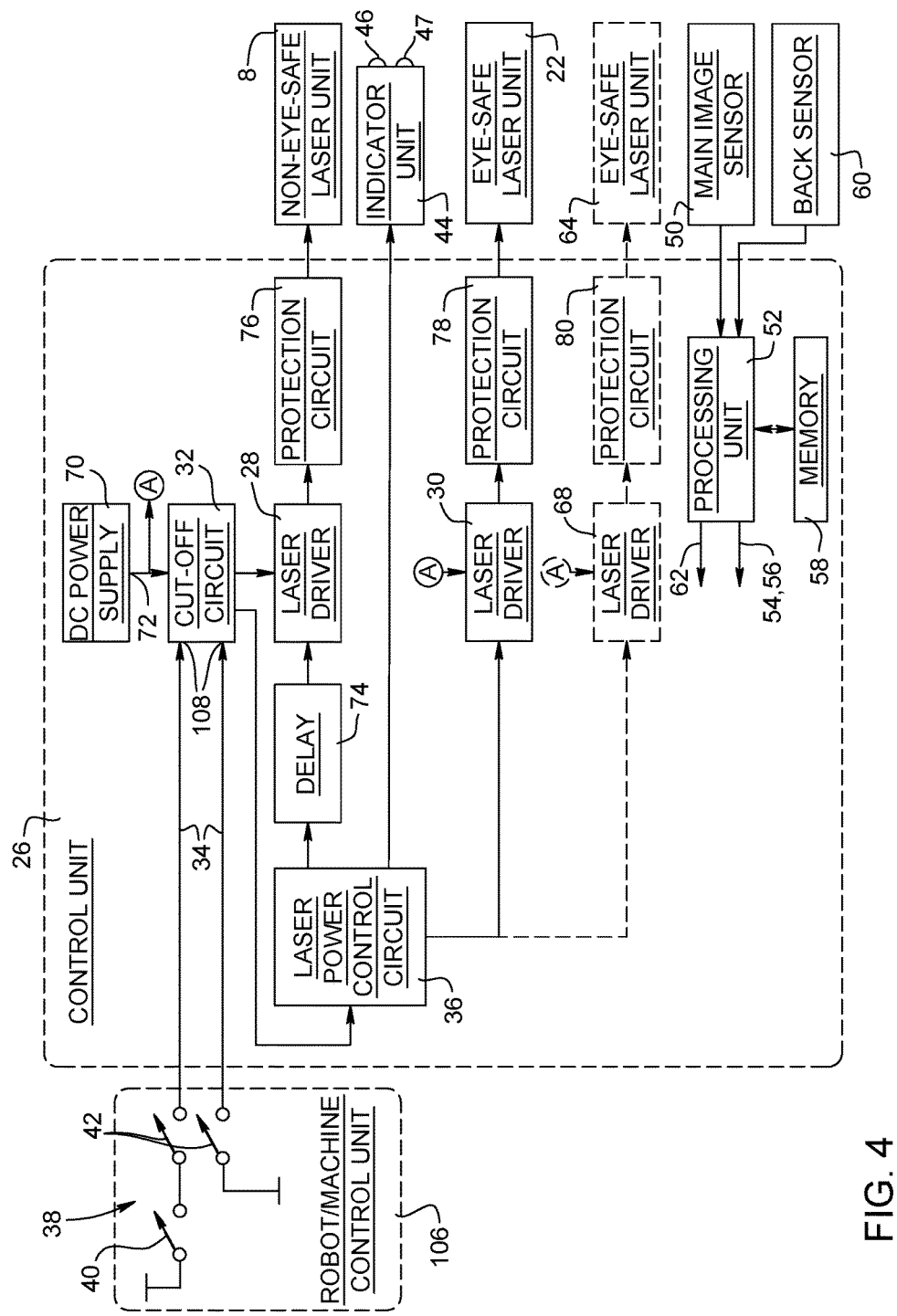
FIG. 4 is a schematic diagram of a control unit of a process tracking laser camera according to an embodiment of the present invention.

Referring to FIG. 4, the camera 2 has a control unit 26 with first and second laser drivers 28, 30 for respectively driving the first and second laser units 8, 22, a cut-off circuit 32 operatively connected to the first laser driver 28 for disabling operation of the first laser unit 8 depending on a control signal 34, and a control circuit 36 for controlling the first and second laser drivers 28, 30 depending on a cut-off condition of the cut-off circuit 32 so that the first laser unit 8 is enabled and the second laser unit 22 is disabled in the non-eye-safe operating mode while the first laser unit 8 is disabled and the second laser unit 22 is enabled in the eye-safe operating mode.

A switch device 38 is connected to the cut-off circuit 32 for providing the control signal 34 controlling the cut-off condition of the cut-off circuit 32 according to a predetermined position setting of the switch device 38 corresponding to the non-eye safe and eye-safe operating modes respectively. The switch device 38 may be formed of a key-lock switch 40 connected in series with a safety interlock switch 42, the non-eye safe operating mode being enabled only when the key-lock switch 40 and the safety interlock switch 42 are for example in closed position.

Preferably, the camera 2 has an external indicator unit 44 connected to the control unit 26 and possibly to the control circuit 36 for providing a visual signal indicative of the operating mode in use.

Referring back to FIG. 1, the external indicator unit 44 may have an arrangement of light-emitting diodes 46, 47 or other light indicators having different colors and selectively activated according to the operating mode in use, so that the workers may easily see when the camera is in the eye-safe operating mode or not.

The eye-safe laser beam 24 may have a shape defining one or more transverse lines (three are illustrated in FIG. 1) generally extending crosswise to a direction of displacement of the process tracking laser camera 2, which would normally be in the same direction as the joint 14. The shape may further define one or more longitudinal lines (one is illustrated in FIG. 1) generally extending in the direction of displacement of the process tracking laser camera 2 and crossing with the transverse lines. One of the transverse line may coincide with a position of a corresponding transverse line of the non-eye-safe laser beam 10 when produced, and another transverse line may cross with a tool center point (TCP) 48 of the robot process tool 6 associated with the process tracking laser camera 2.

As shown in FIG. 4, the control unit 26 may have a processing unit 52 connected to the image sensor 50 for tracking a feature (such as the weld joint 14) on the workpiece 12 and outputting robot programming data 54 when in the eye-safe operating mode and outputting robot programmed path and process parameters corrective data 56 when in the non-eye-safe operating mode. The control unit 26 may have a memory 58 connected to the processing unit 52 for recording operating Y-Z position data of the robot process tool 6 when in the eye-safe operating mode after setting the tool center point 48 at a correct position.

Figure 2:
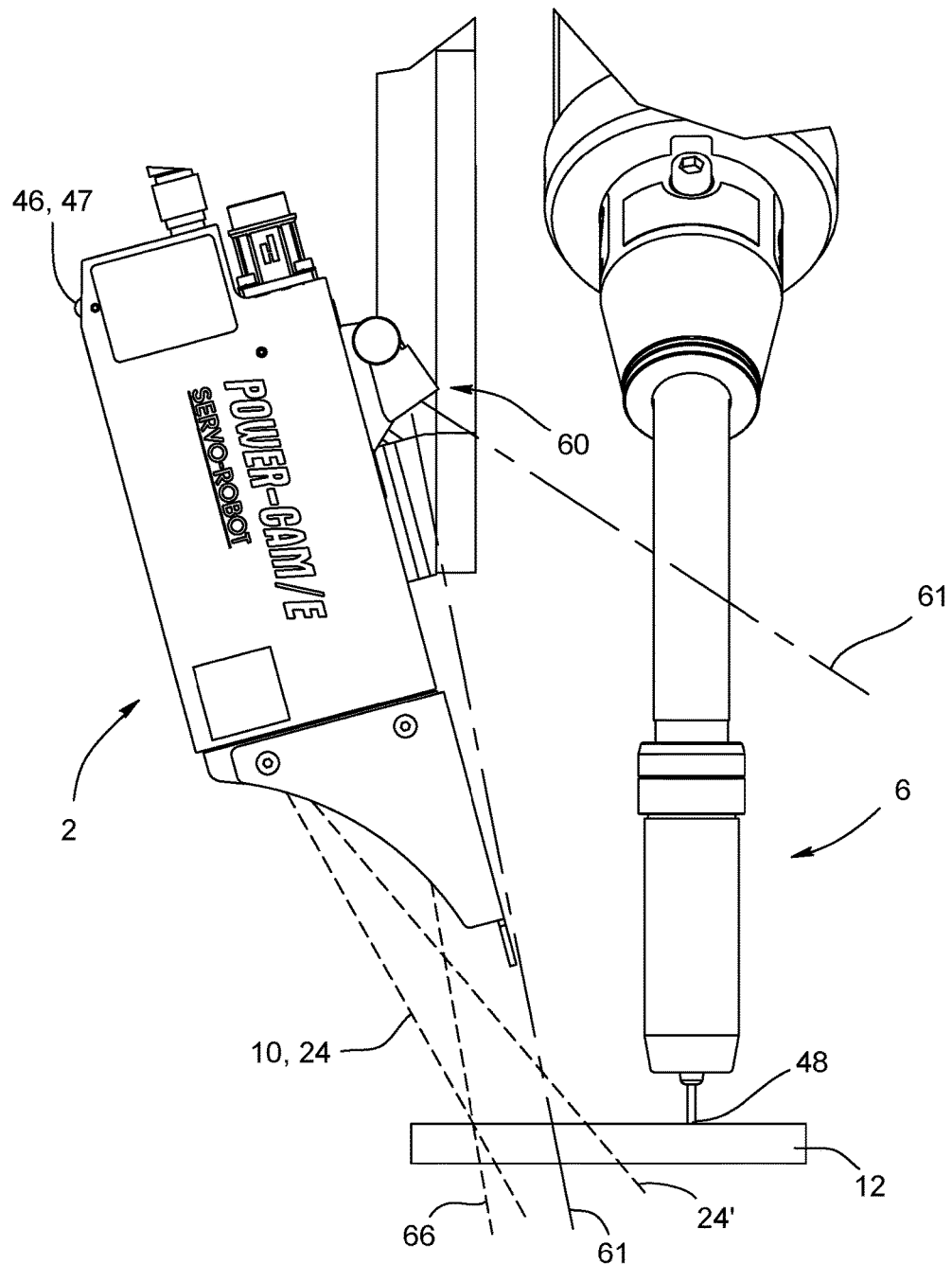
FIG. 2 is a side elevation schematic view of a robot process tool and a process tracking laser camera according to an embodiment of the present invention.

Referring to FIG. 2, the camera 2 may be provided with an additional image sensor 60 (also called back sensor) having a field of view 61 (shown in irregular dashed lines) covering a target area of the workpiece 12 where a portion of the laser beam 24 projected by the second laser unit 22 and an end portion of the robot process tool 6 extend. The portion of the laser beam 24 seen by the image sensor 60 may for example include tracer laser line 24' producing the intermediate transverse line shown in FIG. 1. The end portion of the robot process tool 6 may for example include the tool center point 48. The image sensor 60 may be of a 2D video sensor type and may be used to locate the tracer laser line 24' when, for example, the color of the laser beam 24 prevents the triangulation sensor 50 (as shown in FIG. 3) from detecting it if the triangulation sensor 50 has a narrow optical filter (not shown).

As shown in FIG. 4, the additional image sensor 60 may then be connected to the processing unit 52 to output image data 62 derived from the additional image sensor 60 for remote monitoring or tracking purposes.

Referring to FIGS. 2 and 3, the camera 2 may further have a third laser unit 64 for projecting an eye-safe laser beam 66 (as shown in FIG. 2) towards the target area of the workpiece 12 at an angle different from an angle of the eye-safe laser beam 24 projected by the second laser unit 22 and crossing therewith at a distance from the camera 2 corresponding to a plane of the tool center point 48 of the robot process tool 6, such as the top surface of the workpiece 12 in the illustrated case. If the color of the laser beam 66 is different from the color of the laser beam 24, then observation of both laser beams 24, 66 indicates when the torch or tool assembly is above or below the TCP plane height.

Referring again to FIG. 4, the control unit 26 may then have a third laser driver 68 for driving the third laser unit 64, and the control circuit 36 then controls the third laser driver 68 in a same way as the second laser driver 30 so that the second and third laser units 22, 64 have matching enabled and disabled states (both are on or both are off). The second and third laser beams 24, 66 (as shown in FIG. 2) preferably have a different appearance from each other, such as different colors, patterns, etc.

The control unit 26 may have a DC power supply module 70 connectable to an external power source (not shown) and having an output 72 for producing a DC voltage for operation of the laser units 8, 22, 64. The output 72 is connected to the laser drivers 28, 30, 68 through the cut-off circuit 32 for the laser driver 28 of the first laser unit 8. The output 72 may be directly connected to the other laser drivers 30, 68 as their operation is eye-safe.

To comply with possible regulations, the control unit 26 may have a delay circuit 74 connected between the control circuit 36 and the first laser driver 28 for delaying activation of the first laser driver 28 for a preset time period, for example 3 seconds, when the non-eye-safe operating mode is initiated. The control unit 26 may also have protection circuits 76, 78, 80 connected between the laser drivers 28, 30, 68 and the laser units 8, 22, 64.

The eye-safe laser tracer unit 22 added to the seam tracking laser camera 2 thus allows safe adjustment of the process head 6 and set-up and robot programming by a human operator before a manufacturing sequence. In a preferred embodiment of the present invention, with the safety lock switch 40 set at safe position, the higher power non eye-safe red line tracking laser unit 8 is turned off and the safe low power green line laser tracer unit 22 is switched on. The position of the tracer laser line 24 on the workpiece 12 coincides with the position of the tracking laser line but its visual appearance, e.g. color, is different. The correct operating tool or torch position can be measured by the laser tracer unit 22 during robot or machine teaching. The tracer laser projection can take various shapes, such as one single line perpendicular to the joint 14, with or without a central line parallel to the joint 14 extending up to the TCP 48, or multiple lines, circles or dots with different configurations depending on the application. The high power non eye-safe tracking laser unit 8 is used for processing or welding in automatic mode while the lower power eye-safe laser unit 22 is used for operator-assisted robot position adjustment, tracking and programming without welding, thereby contributing to complete automation of mechanized or robotized manufacturing process, from part and joint location through joint tracking and complete execution of the process.

In the eye-safe operating mode, the eye-safe laser unit 22 allows safe robot programming by an operator without wearing special protective eyewear. In the non-eye-safe operating mode, the non-eye-safe laser unit 8 allows joint tracking. Change between the safe programming mode and the processing mode is achieved through operation of the switch device 38. The active operating mode is easily identifiable by workers present in the robot area based on the color or appearance of the laser projection, and the color (or flashing) of the active LED 46, 47 on the indicator unit 44 when the camera 2 has such a unit 44. When the eye-safe laser unit 22 is turned on using the switch device 38, the non-eye-safe laser unit 8 is automatically turned off. As the two laser projections have different colors, such as red or blue for the tracking laser unit 8 and green for the tracer laser unit 22, or different appearances such as a continuous line for the tracking laser unit 8 and a dotted or pulsed line for the tracer laser unit 22, the operator can easily identify the camera's operating mode in use. For safety reason, the tracer laser unit 22 is turned off when the tracking laser unit 8 is switched back on, so that observation of a different color or aspect of the tracer laser unit 22 provides a clear indication of an eye-safe operating mode.

Referring again to FIG. 3, the tracer laser unit 22 may be formed of an arrangement having a diode 82, an optical collimator 84 and a compact line lens 86. A similar arrangement may be used for the optional eye-safe laser unit 64 which is coupled to a beam splitter/combiner 88 shared with the image sensor 50. When in eye-safe operating mode for robot teaching, the joint location can be measured by triangulation of the tracer laser unit 22 using an optical band pass filter (not shown) with a pass band range adapted to the tracer laser wavelength. The measurement of the tracer laser line location enables detection of the joint 14 and tracking without welding for robot program verification purposes.

Figure 5:
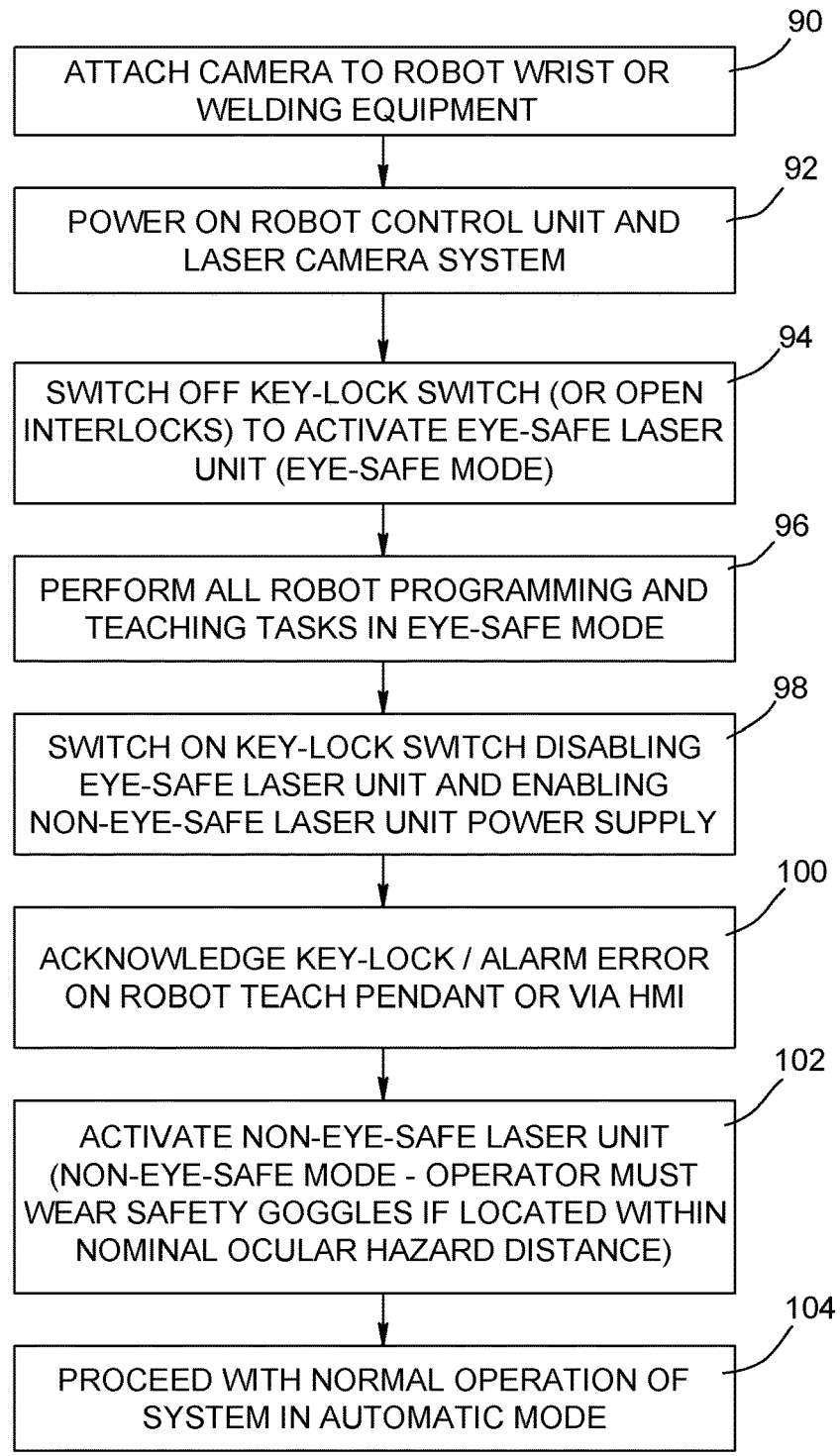
FIG. 5 is a flowchart illustrating steps in eye-safe and non-eye-safe operating modes using a process tracking laser camera according to en embodiment of the present invention.

Referring to FIG. 5, there is shown a possible sequence of steps for programming and teaching the process robot in eye-safe operating mode prior to passing into normal non eye-safe operating mode (laser tracking). As depicted by block 90, the camera 2 is initially attached to the robot wrist 4 or the welding or other equipment. The robot control unit 106 (as shown in FIG. 4) and the camera 2 are then powered on as depicted by block 92. For teaching and programming the robot before automatic processing or welding, the operator turns the key-lock switch 40 into the eye-safe operating mode as depicted by block 94, thus ensuring that the tracking laser unit 8 is switched off and the tracer laser unit 22 is turned on. Using the tracer laser unit 22, the operator moves the robot arm to the correct processing position and teaches the robot with the path of the processing sequence as depicted by block 96. By triangulation of the tracer laser unit 22 or with the position of the tracer line on the 2D video image provided by the back sensor 60, the robot learns the exact 3D position of the joint 14 and of the path to follow in order to execute perfect or the best processing or welding of the joint 14. After teaching the robot, the operator can walk away from the processing zone, turn the key-lock switch 40 to the tracking mode position and start the robot processing or welding task as depicted by block 98. By turning the safety key switch 40 to the tracking mode position, the tracer laser unit 22 is switched off and the tracking warning LED 46 is turned on and the safety interlock switch 42 secures the robot area. It may be necessary to acknowledge a key-lock/alarm error on the robot teach pendant (not shown) or via HMI (Human-Machine Interface) as depicted by block 100 for activation of the tracking laser unit 8 as depicted by block 102. Indeed, when the key switch 40 is switched off to activate the green tracer laser unit 22 and program the robot, the robot control unit 106 may issue an error message on the robot teach pendant or any other process control interface such as the HMI, which may be a controller of the robot, a PC or a tablet. This message indicates that the current state of the system does not allow activating the red laser unit 8 or other dangerous process. After programming, when the key switch 40 is switched back for normal processing (e.g. welding with red laser triangulation), the system should be informed that the error, in the present case the green laser sequence during which no red laser or welding is allowed, is finished and corrected and that the red laser may now be turned on and the welding or other processing may resume or take place. The term "error" is used here because the message may also originate from another cause of error such as a component malfunction or an intruder in the welding area who for example opened a gate with the interlock switch 42. This additional security measure ensures that a qualified operator has truly authorized the resuming of the dangerous process. Since the camera 2 is then in normal/tracking/non-eye-safe operating mode, the operator must then wear safety goggles or the like if located within a nominal ocular hazard distance or in the closed laser controlled area. The robot may then proceed with normal operation of the system in automatic mode as depicted by block 104.

Referring again to FIG. 4, the key-lock switch 40 and/or the safety interlock switch 42 may have the following behavior: in closed position, the tracking laser unit 8 (non-eye-safe) is enabled and the eye-safe laser tracer unit 22 is disabled while in open position, the tracking laser unit 8 is disabled and the eye-safe laser tracer unit 22 is enabled. The safety interlock switch or switches 42 may be installed around the perimeters of the automated working cell in order to stop operation of the laser unit 8 and prevent it from projecting the laser beam 10 if some condition is not met, such as if a room door is opened. The DC power supply module 70 may be formed of a DC/DC converter that converts a camera input power to a lower voltage suitable to power the laser circuits and diodes. The cut-off circuit 32 may be such as to monitor a laser-enable input 108 (receiving the control signal 34 from the key-lock switch 40 and/or safety interlock switch 42) and shut down power supply to the non-eye-safe tracking laser driver 28 when the laser-enable input 108 is not powered. The laser power control circuit 36 may be made of distinct circuits for each laser unit circuit line if desired. The control circuit 36 may contain control logic that allows activating and de-activating the laser units 8, 22, 64 using software controls and may also be used for adjustment of laser output power through system registers. The delay circuit 74 and related circuits of the control unit 26 may exhibit the following behavior: when the laser-enable input 108 is activated, the laser-on LED 46 is instantly activated and a 3-second (or other) delay is triggered. The laser driver 28 will be activated only after the 3-second delay has expired. The laser drivers 28, 30, 68 may be such as to drive the required current to power the respective laser units 8, 22, 64. The protection circuits 76, 78, 80 may provide over-voltage and over-current protection and be made of passive components to ensure proper laser diode protection from premature damage due to spikes or ESD (electrostatic discharge).

While embodiments of the invention have been illustrated in the accompanying drawings and described above, it will be evident to those skilled in the art that modifications may be made therein without departing from the invention.

The invention claimed is:

1. A process tracking laser camera with non-eye-safe and eye-safe operating modes, comprising:
    an image sensor having a field of view covering a target area of a workpiece;
    a first laser beam projector, for projecting a non-eye-safe laser beam towards the target area of the workpiece;
    a second laser beam projector, for projecting an eye-safe laser beam towards the target area of the workpiece, the eye-safe laser beam having an appearance different from the non-eye-safe laser beam, wherein the eye-safe laser beam has a shape defining one or more transverse lines substantially extending crosswise to a direction of displacement of the process tracking laser camera;
    a laser driver controller having first and second laser drivers for respectively driving the first and second laser beam projectors, a cut-off circuit operatively connected to the first laser driver for disabling operation of the first laser beam projector depending on a control signal, and a control circuit for controlling the first and second laser drivers depending on a cut-off condition of the cut-off circuit so that the first laser beam projector is enabled and the second laser beam projector is disabled in the non-eye-safe operating mode while the first laser beam projector is disabled and the second laser beam projector is enabled in the eye-safe operating mode; and
    a switch device, connected to the cut-off circuit, for providing the control signal controlling the cut-off condition of the cut-off circuit according to a predetermined position setting of the switch device corresponding to the non-eye safe and eye-safe operating modes respectively.

2. The process tracking laser camera according to claim 1, wherein the switch device comprises a key switch connected in series with a safety interlock switch, the non-eye safe operating mode being enabled only when the key switch and the safety interlock switch are in closed position.

3. The process tracking laser camera according to claim 1, wherein the first and second laser beam projectors are positioned closed to each other and have a common optical arrangement for coincidentally projecting the respective laser beams at a same location on the workpiece.

4. The process tracking laser camera according to claim 1, further comprising an external indicator unit, connected to the control unit, for providing a visual signal indicative of the operating mode in use.

5. The process tracking laser camera according to claim 4, wherein the external indicator unit comprises an arrangement of light-emitting diodes having different colors and selectively activated according to the operating mode in use.

6. The process tracking laser camera according to claim 1, wherein the appearance of the eye-safe laser beam comprises one of a flashing state, a color and a pattern different from that of the non-eye-safe laser beam.

7. The process tracking laser camera according to claim 1, wherein the eye-safe laser beam has a green color.

8. The process tracking laser camera according to claim 1, wherein the shape of the eye-safe laser beam further defines one or more longitudinal lines substantially extending in the direction of displacement of the process tracking laser camera and crossing with said one or more transverse lines.

9. The process tracking laser camera according to claim 8, wherein said one or more transverse lines comprise a first transverse line coinciding with a position of a corresponding transverse line of the non-eye-safe laser beam, and a second transverse line crossing with a tool center point of a robot process tool associated with the process tracking laser camera.

10. The process tracking laser camera according to claim 1, wherein the laser driver controller has a processing unit connected to the image sensor for tracking a feature on the workpiece and outputting robot programming data when in the eye-safe operating mode and outputting robot programmed path and process parameters corrective data when in the non-eye-safe operating mode.

11. The process tracking laser camera according to claim 10, wherein the laser driver controller has a memory connected to the processing unit for recording operating Y-Z position data of a robot process tool when in the eye-safe mode after setting a tool center point at a correct position.

12. The process tracking laser camera according to claim 10, further comprising an additional image sensor having a field of view covering a target area of the workpiece where a portion of the laser beam projected by the second laser beam projector and an end portion of a robot process tool extend, the additional image sensor being connected to the processing unit, the processing unit outputting image data derived from the additional image sensor for remote monitoring or tracking.

13. A process tracking laser camera with non-eye-safe and eye-safe operating modes, comprising:
    an image sensor having a field of view covering a target area of a workpiece;
    a first laser beam projector, for projecting a non-eye-safe laser beam towards the target area of the workpiece;
    a second laser beam projector, for projecting a first eye-safe laser beam towards the target area of the workpiece, the first eye-safe laser beam having an appearance different from the non-eye-safe laser beam;
    a third laser beam projector, for projecting a second eye-safe laser beam towards the target area of the workpiece; at an angle different from an angle of the first eye-safe laser beam projected by the second laser beam projector and crossing therewith at a distance from the process tracking laser camera corresponding to a plane of a tool center point of a robot process tool associated with the process tracking laser camera;
    a laser driver controller having first, second and third laser drivers for respectively driving the first, second and third laser beam projectors, a cut-off circuit operatively connected to the first laser driver for disabling operation of the first laser beam projector depending on a control signal, and a control circuit for controlling the first, second and third laser drivers depending on a cut-off condition of the cut-off circuit so that the first laser beam projector is enabled and the second and third laser beam projectors are disabled in the non-eye-safe operating mode while the first laser beam projector is disabled and the second and third laser beam projectors are enabled in the eye-safe operating mode; and a switch device, connected to the cut-off circuit, for providing the control signal controlling the cut-off condition of the cut-off circuit according to a predetermined position setting of the switch device corresponding to the non-eye safe and eye-safe operating modes respectively.

14. The process tracking laser camera according to claim 13, wherein the second and third laser beams have a different appearance from each other.

15. The process tracking laser camera according to claim 14, wherein the different appearance is a different color.

16. The process tracking laser camera according to claim 1, wherein the laser driver controller has a DC power supply module connectable to an external power source and having an output for producing a DC voltage for operation of the laser units, the output being connected to the laser drivers through the cut-off circuit for the laser driver of the first laser beam projector.

17. A process tracking laser camera with non-eye-safe and eye-safe operating modes, comprising:

an image sensor having a field of view covering a target area of a workpiece;

a first laser beam projector, for projecting a non-eye-safe laser beam towards the target area of the workpiece;

a second laser beam projector, for projecting an eye-safe laser beam towards the target area of the workpiece, the eye-safe laser beam having an appearance different from the non-eye-safe laser beam;

a laser driver controller having first and second laser drivers for respectively driving the first and second laser beam projectors, a cut-off circuit operatively connected to the first laser driver for disabling operation of the first laser beam projector depending on a control signal, and a control circuit for controlling the first and second laser drivers depending on a cut-off condition of the cut-off circuit so that the first laser beam projector is enabled and the second laser beam projector is disabled in the non-eye-safe operating mode while the first laser beam projector is disabled and the second laser beam projector is disabled in the non-eye-safe operating mode while the first laser beam projector is disabled and the second laser beam projector is enabled in the eye-safe operating mode, and wherein the laser driver controller further includes a delay circuit connected between the control circuit and the first laser driver for delaying activation of the first laser driver for a preset time period when the non-eye-safe operating mode is initiated; and a switch device, connected to the cut-off circuit, for providing the control signal controlling the cut-off condition of the cut-off circuit according to a predetermined position setting of the switch device corresponding to the non-eye safe and eye-safe operating modes respectively.

18. The process tracking laser camera according to claim 1, wherein the laser driver controller has protection circuits connected between the laser drivers and the laser beam projectors.

* * * * *